United States Patent [19]
Chieh et al.

[11] Patent Number: 6,072,532
[45] Date of Patent: Jun. 6, 2000

[54] METHOD AND APPARATUS FOR GENERIC INSERTION OF DATA IN VERTICAL BLANKING INTERVALS

[75] Inventors: Baldwin Chieh, Vancouver, Wash.; Kenn Heinrich, Toronto; Paul Nicholas, Scarborough, both of Canada

[73] Assignee: Scientific-Atlanta, Inc., Norcross, Ga.

[21] Appl. No.: 08/802,389

[22] Filed: Feb. 18, 1997

[51] Int. Cl.[7] .............................. H04N 7/00; H04N 11/00
[52] U.S. Cl. ........................... 348/478; 348/467; 348/468
[58] Field of Search ...................................... 348/468, 467, 348/465, 464, 476, 477, 478; H04N 7/00, 11/00

[56] References Cited

U.S. PATENT DOCUMENTS

| | | | |
|---|---|---|---|
| 4,667,235 | 5/1987 | Nozoe et al. | 348/464 |
| 4,673,979 | 6/1987 | Kobo et al. | 348/464 |
| 4,803,552 | 2/1989 | Marin . | |
| 5,453,794 | 9/1995 | Ezaki . | |
| 5,493,339 | 2/1996 | Birch et al. . | |
| 5,532,752 | 7/1996 | Miyano | 348/468 |
| 5,555,025 | 9/1996 | McArthur . | |
| 5,589,886 | 12/1996 | Ezaki | 348/468 |
| 5,699,124 | 12/1997 | Nuber et al. . | |

OTHER PUBLICATIONS

Teletext Signal Generation Equipment and Systems—Peter L. Mothersole pp. 345–352.

*Primary Examiner*—Nathan Flynn
*Assistant Examiner*—Vivek Srivastava
*Attorney, Agent, or Firm*—Kenneth M. Massaroni; Hubert J. Barnhardt, III; Kelly A. Gardner

[57] ABSTRACT

A method and apparatus for manipulating and de-manipulating Vertical Blanking Interval (VBI) data having any one of a plurality of formats, comprising an encoder, a transmission medium and a decoder. The encoder receives the VBI data having an original data format and manipulates the format of the VBI data into a general VBI format. This signal is transferred to the decoder where the decoder de-manipulate the general VBI format of the VBI data into the original VBI format.

14 Claims, 10 Drawing Sheets

| BITS | # OF BITS | NAME | DESCRIPTION |
| --- | --- | --- | --- |
| 0-3 | 4 | HEADER | SET TO 0x7 FOR VBI_GENERIC |
| 4-7 | 4 | DECODER | DECODER TYPE (0x0 FOR ALL DECODERS) |
| 8 | 1 | FIRST_PACKET | 1- INDICATES THE FIRST PACKET IN A FRAME |
| 9 | 1 | PACKET_REPEAT | 0- NO REPEAT 1- REPEAT- DATA BYTES START AT BIT 24 INSTEAD OF BIT 80. THE VBI GENERIC PARAMETERS TO BE USED ARE THE SAME AS THE PREVIOUS PACKET. |
| 10-15 | 6 | VBI_COUNT | NUMBER OF BYTES REMAINING IN PACKET (RANGE 0x00-0x1F) |
| 16 | 1 | VBI_FRAME | FRAME BIT (TOGGLED ON CHANGE OF FRAME) |
| 17 | 1 | VBI_FIELD | FIELD BIT (0=1ST 1=2ND) |
| 18 | 1 | SPARE | SET TO 0 |
| 19-23 | 5 | VBI_LINE | VIDEO LINE TO NUMBER TO INSERT DATA (RANGE 0x00-0x1F) |
| 24-26 | 3 | SPARE | |
| 27-30 | 4 | REPEAT | THE NUMBER OF TIMES EACH BIT IS REPEATED |
| 31-39 | 9 | VBI_START | START OF VBI DATA ON THE LINE |
| 40-47 | 8 | X | INTEGRAL VALUE OF THE ADDRESS GENERATOR |
| 48-55 | 8 | I | MODULO OF DIFFERENCE OF THE FRACTIONAL PART |
| 56-63 | 8 | J | NUMERATOR OF THE FRACTIONAL PART |
| 64-71 | 8 | SCALE_FACTOR | SYMBOL SCALE FACTOR |
| 72-79 | 8 | SYMBOL_OFFSET | SYMBOL OFFSET VALUE |
| 80-(VBI_COUNT-8) | 8 | DATA | REST OF DATA |

METHOD AND APPARATUS FOR GENERIC INSERTION OF DATA IN VERTICAL BLANKING INTERVALS

BACKGROUND OF THE INVENTION

1. Field of the Invention

In general, the present invention relates to television signals having Vertical Blanking Interval (VBI) data, and more particularly to the encoding and decoding of VBI data.

2. Statement of Related Art

In television broadcast systems, a television picture is referred to as a "raster." In the United States, a raster consists of 525 horizontal lines for video data sent over the course of two successive interlaced fields. These horizontal lines make up the full scope of the television screen. The horizontal lines are displayed in a receiving television set sequentially; however, they are displayed with such speed that a viewer sees only the complete picture, not the individual lines. The first several lines are said to be "blanked", and the time interval associated with these lines is referred to as the Vertical Blanking Interval (VBI). The VBI is essentially the portion of the television signal which carries no visual information and appears as a horizontal black bar between the pictures when a TV set needs vertical tuning. VBI lines are often used to transmit a variety of test and control signals as well as certain types of data. In particular, the VBI is used by the television set to determine where on the television screen the video signal should be displayed.

The VBI is often used to transmit digital data and test signals along with the audio and video signals. For instance, in the United States, the Federal Communications Commission has authorized the insertion of test, cue, control, reference, and program-related signals during the VBI. These signals may be used to control and monitor the performance of studios, networks, and transmitters; to provide reference signals for automatic control of receivers equipped with vertical interval reference (VIR) circuits; and to offer audible and visual program material ancillary to the standard television broadcast.

Although television broadcast systems which are in use today transmit analog signals, digital VBI data is essentially transmitted in serial bitstream format. This is accomplished by switching the analog television signal between high and low amplitude levels. The digital VBI data is provided at a frequency which is often an integer multiple of the horizontal line rate; the particular multiple used depends upon the VBI format being used (e.g., World System Text, North American Basic Text Standard, Vertical Interval Time Code, etc.). Digitized data can also be inserted into the VBI for transmission at rates greater than 100,000 bps. The data embedded in the VBI signal can then be retrieved from a standard cable or a satellite system by a receiver set. Software packages then allow subscribers instant access to the information and can be displayed in a number of formats.

Over recent years, a variety of services have made use of the VBI lines to transmit data including Close-Captioned for the hearing impaired, A. C. Nielsen program identification, videotext and teletext news services. In addition, information services such as stock market quotations and news offerings are now available via the VBI of a CATV signal. VBI signals are now widely used throughout the world. However, these services differ in the way that the VBI data is formatted. A number of format standards are used around the world. The type of VBI data format used generally depends upon the geographic region and the particular cable television service provider.

The fact that there are a number of different VBI format standards throughout the world is problematic since each VBI format standard requires configuration of the television broadcast system according to the particular format requirements for that VBI format. Particularly, for each VBI format, the television broadcast system requires configuration on the transmitting side and the receiving side. Television broadcasters must customize their transmission system according to the format requirements of a given geographic region or of a particular customer. Similarly the customer's receiving system must be configured for a particular VBI format. It is therefore desirable to have a single television broadcast system that is capable of handling VBI data regardless of its format.

For example, this need was recognized in McArthur, U.S. Pat. No. 5,555,025, which describes a circuit for decoding VBI television data having any one of a plurality of VBI formats. In the decoder, the controller receives the digitized television signal, the clock signal and a format signal from a host computer system indicating which VBI format is to be decoded. The controller generates a sample signal at the data frequency in response to the clock signal and the VBI format signal and causes a register to load VBI data at the midpoint in time of each bit of VBI data.

However, the McArthur patent is limiting in that the decoder requires information relating to the format of the data signal that it receives. The implementation of the decoder requires a host computer system which provides the decoder with the appropriate information relating to format of the data signal. As a result, information relating to the various data formats must be pre-programed into the host computer system. If a new data format was to be subsequently implemented, the host computer system would not have the necessary format information for the decoder to decode incoming data. Further, the McArthur patent does not teach an encoder that is capable of handling any number of VBI formats. In general, the McArthur patent fails to teach a television broadcast system that handles VBI data regardless of its format.

It is therefore an object of the present invention to provide a universal television communications system capable of transferring VBI data regardless of the VBI data format.

It is another object of the invention to provide an encoder and decoder that may be implemented to handle VBI data communication regardless of the VBI format being used.

A further object of the invention is to provide an encoder and a decoder that capable of respectively manipulating and de-manipulating VBI data to and from an arbitrary VBI format.

A further object of the invention is to provide an encoder and decoder that may be used for all data formats including those presently known as well as those that may be developed in the future.

Yet another object is to provide a method or apparatus of converting VBI data from a certain format to an arbitrary generic data format and reconverting the VBI data from the arbitrary generic format back to the previous data format.

SUMMARY OF THE INVENTION

The present invention is a method and apparatus for manipulating and de-manipulating Vertical Blanking Interval (VBI) data having any one of a plurality of formats for providing a television broadcast system capable of handling the transfer of VBI data regardless of the particular format being used. The television broadcast system generally includes an encoder, a communications medium and a decoder. The encoder receives the VBI data and manipulates the format of the VBI data into an arbitrary general format. The encoder includes a synchronization circuit and a data slicer. The data slicer converts the analog VBI data back into digital bits in accordance with the required phase and magnitude determined by the synchronization circuit. The modulated VBI data is then formatted according to an arbitrary general format. The VBI data in its arbitrary general format is then transferred over the transmission medium from the encoder to the decoder. The decoder receives the VBI data and de-manipulates the format of the VBI data into its original format. The decoder includes an address accumulator, a data manager, a one-bit waveform Prom and a multiplexing circuit. The address accumulator adjusts the base frequency of the decoder in accordance with the required frequency of the original VBI data format and provides this information to the data manager and the one-bit waveform Prom. The data manager stores and manages the incoming VBI data and outputs the VBI data as it is needed for further processing by the multiplexing circuit. The one-bit waveform Prom receives address information from the address accumulator and outputs corresponding waveform information to the multiplexing circuit. The multiplexing circuit receives the waveform information and the VBI data and completes the de-manipulation of the VBI data into its original VBI data format.

These as well as other novel advantages, details, embodiments, features and objects of the present invention will be apparent to those skilled in the art from following the detailed description of the invention, the attached claims and accompanying drawings, listed hereinbelow, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which.

DETAILED DESCRIPTION OF THE INVENTION

For a better understanding of the present invention, reference may be had to the following detailed description taken in conjunction with the appended claims and accompanying drawings.

The present invention is designed to handle a wide variety of VBI data formats including, but not limited to, World System Text (WST), North American Basic Text Standard (NABTS), and Vertical Interval Time Code (VITC). The various VBI formats are similar in the basic waveform pattern and differ primarily in sample frequency, amplitude and the line number in which the VBI data is displayed. For instance, most systems transfer roughly fourteen bits of data per television line during the VBI. WST, on the other hand, is capable of transferring 360 bits of data per television line of VBI (including run-in bits). By providing a VBI generator that is capable of varying all of these parameters while maintaining accuracy of the data, most VBI formats, including those that are presently utilized as well as those that may be developed in the future, can be implemented.

Figure 1:
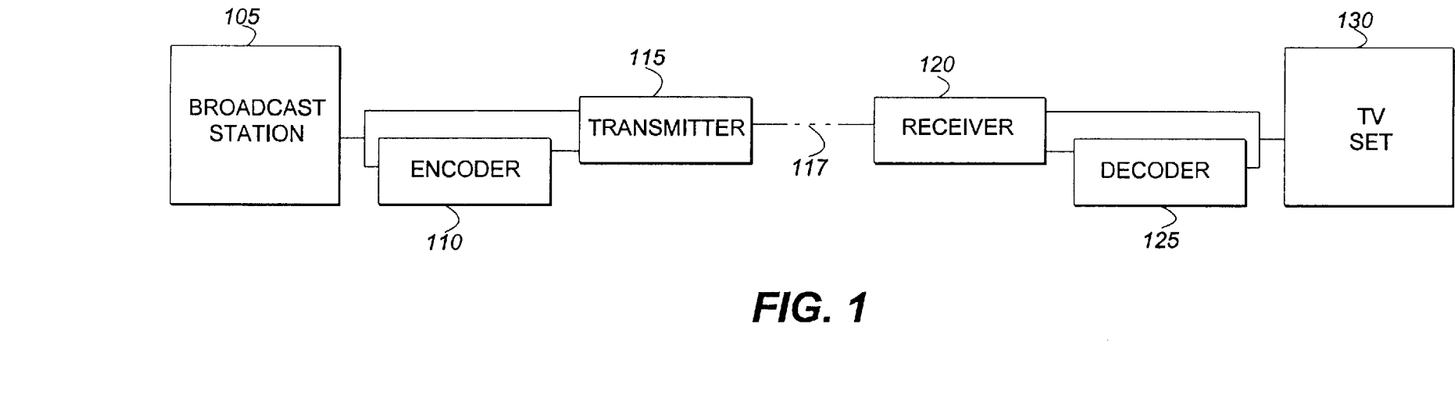
FIG. 1 is a schematic block diagram of a television broadcast system in accordance with the present invention.

FIG. 1 is a schematic block diagram of a television broadcast system in accordance with the present invention. The television broadcast system generally includes a broadcast station 105, an encoder 110, a transmitter 115, a communications medium 117, a receiver 120, a decoder 125, and a TV set 130. The broadcast station 105 produces a television signal which is an analog signal having video/audio information with superimposed VBI data. The analog signal is provided to an encoder 110 which extracts the analog VBI data and manipulates the VBI data into a digital packet representation conforming to the VBI packet format described herein. The VBI data and the video/audio signals are then sent to the transmitter 115 for transmission over the communications link 117. The video/audio signal may be formatted in accordance with any available format including, but not limited to, Moving Pictures Expert Group 2 (MPEG2), Phase Alernation Line ("PAL"), PAL-M, National Television Standards Committee ("NTSC"), and Systeme Electronique Couleur Avec Memoire (SECAM). The VBI data signal and the video/audio signals are then transmitted over the communications medium 117, typically a satellite system, to a number of receiving stations. For clarity in the figure, the details of only one receiving station is shown. Other receiving stations are similarly configured. At the receiving station, the VBI data and the video/audio signals are received by a receiver 120. The VBI data is provided to a decoder 125 which converts the VBI data having the VBI packet format described herein and de-manipulates the VBI data into its original format. The VBI data and the video/audio signals are then combined and provided to a TV set 130 or an analog decoding device for further processing or for viewing. The present invention is described in further detail below.

Transmitter Side

On the transmitting side, the present invention is preferably implemented in the encoder 110 which receives the video analog signal having superimposed VBI analog data. The encoder 110 is preferably configured with the necessary information regarding the VBI format that is being used by the particular broadcast station. This information is desirable to achieve proper sampling of the VBI data signal. The configuration parameters of interest for any given VBI data format include, but are not limited to, bit rate, synchronization scheme and amplitude. Alternatively, the encoder 110 may also be capable of independently determining the particular format of the VBI data by trial and error sampling and analyzing of the VBI data to determine the format that is being used. The encoder 110 preferably utilizes a DSP microprocessor running a computer software program to perform its functions under the present invention. Alternatively, the encoder 110 may also utilize a combination of a conventional analog phase-locked loop, analog data bit slicer, and a digital sync code detector. In addition, the encoder 110 is preferably adaptable to handle any number of data signal formats having varying parameters including, but not limited to, bit rate, amplitude and synchronization scheme.

Figure 2:
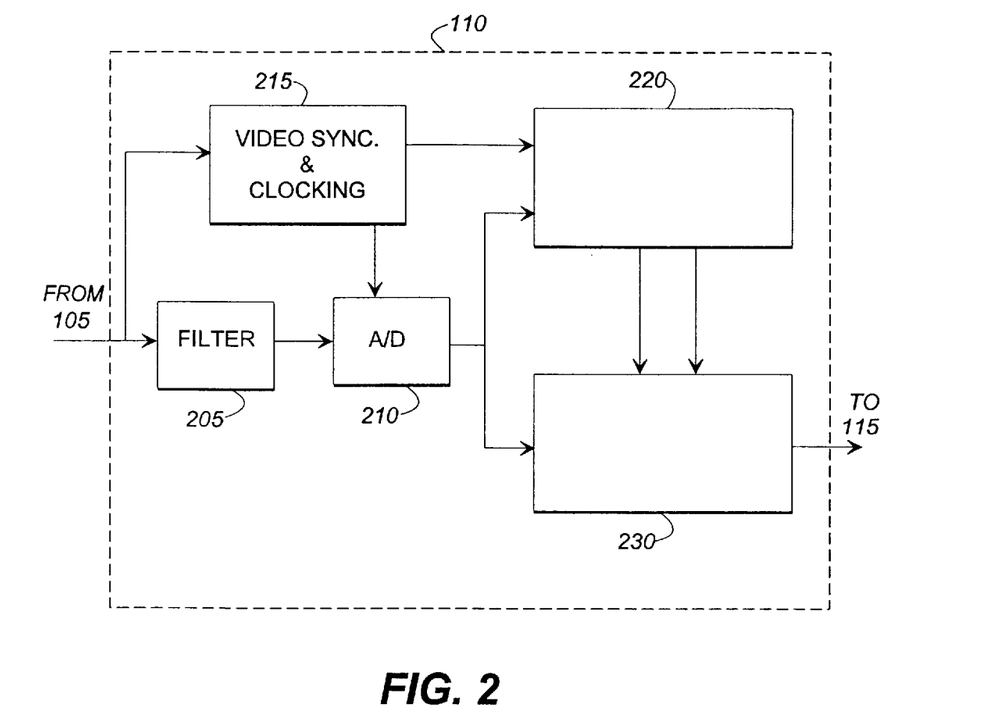
FIG. 2 is a schematic block diagram detailing the operation of the encoder in accordance with the present invention.

FIG. 2 is a schematic block diagram detailing the operation of the encoder 110 in accordance with the present invention. Although it receives both analog video/audio and VBI data signals, the encoder 110 essentially extracts and manipulates the superimposed VBI data leaving the video/audio signal intact. The incoming signal is first provided to an anti-alias filter 205 and a video synchronization and clocking circuit 215. The video synchronization and clocking circuit 215 extracts the synchronization signal information from the video/audio signal for later processing. The video synchronization and clocking circuit 215 is generally known in the art. After being filtered by the anti-alias filter 205, the analog signal is converted into a digital representation by the A/D converter 210 in accordance with information from the video synchronization and clocking circuit 215. The signal is then fed into the synchronization block 220 and the sampling block 230 where the VBI data is manipulated to conform to the VBI packet definition described herein. The synchronization block 220 provides information relating to the sampling phase and the reference magnitude to the sampling block 230. The sampling block 230 receives the digital signal and the sampling phase and reference magnitude information from the synchronization block 220 and manipulates the VBI data to conform to the VBI packet definition described herein. The synchronization block 220 in combination with the sampling block 230 is preferably a software algorithm subroutine implemented in a DSP microprocessor. Alternatively, the synchronization block 220 and the sampling block 230 may be implemented as electrical circuits as shown in FIGS. 3–6. The synchronization block 220 and the sampling block 230 are described in further detail below.

The encoder 110 preferably uses digital signal processing to lock to the incoming signal line-by-line as shown below by the description of the synchronization block 220. One requirement is that the VBI data frequency must be locked to the video line frequency. The video line frequency is extracted by the video synchronization and clocking circuit 215.

VBI data formats in general implement either a periodic clock run-in signal with a sync pattern signal or simply a sync pattern signal. Periodic clock run-in signals usually have a format of alternating 0 and 1 bits and eventually looks like a sinusoidal signal when processed. The periodic clock run-in signal and the sync pattern signal serve to provide information relating to the frequency and the phase of the incoming signal. The synchronization block 220 processes the VBI data differently depending upon whether the VBI data format utilizes a periodic clock run-in signal with or without a sync pattern signal. As preferred, the encoder 110 may be configured according to the particular type of synchronization system is used.

Figure 3:
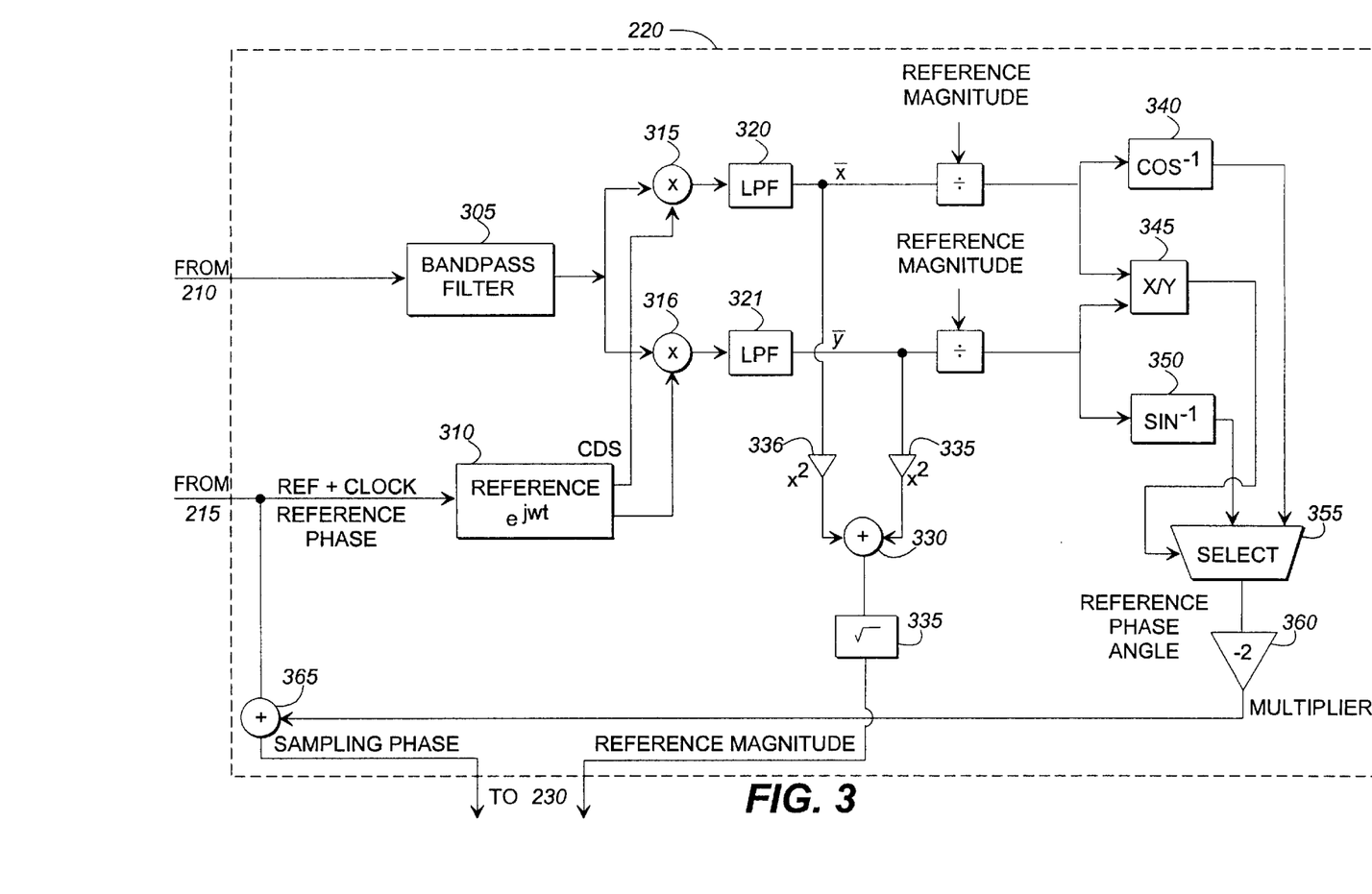
FIG. 3 is a detailed schematic diagram of the synchronization block for VBI data having a periodic clock run-in signal.

FIG. 3 is a detailed schematic diagram of the synchronization block 220 for VBI data having a periodic clock run-in signal. The steps of the software algorithm subroutine can be conceptualized by this electrical circuit diagram as described below. The digital signal from the A/D converter 210 is first fed into a bandpass filter 305 to remove noise and to immunize the signal from transmission noise. Information from the video synchronization and clocking circuit 215 is received at 310 and an arbitrary reference frequency for demodulation of the VBI signal is generated having sine and cosine components of the reference frequency. The digital signal from the bandpass filter 305 is split and quadrature demodulated at 315 and 316 with the respective sine and cosine components of the reference frequency generated from 310 in accordance with the following expressions:

$$x(t) = vbi(t) \cos (2\pi ft)$$

$$y(t) = vbi(t) \sin (2\pi ft)$$

where vbi(t) is the digital signal from the bandpass filter 305, and f is the reference frequency generated from 310. The reference frequency f is equal to the frequency of the expected periodic clock run-in signal which is often ½ of the bit frequency.

Each quadrature demodulated output is then sent through low pass filters 320 and 321 and then processed to determine the reference magnitude of the VBI data signal and the reference phase angle. The reference phase angle is the difference between the periodic clock run-in signal and the reference frequency. The reference phase angle establishes the exact position of the VBI data signal that should be sampled by the sampling block 230. The reference magnitude provides a reference level for the sampling block 230 of the incoming VBI data for determining whether a given data bit is high or low.

The reference magnitude is determined by squaring and adding the two low pass filtered signals (from 320 and 321) and then taking the square root of the sum. The reference magnitude determination is shown schematically by elements 325, 326, 330 and 335. The reference magnitude can also indicate that no VBI data signal was present if the VBI data signal was below a certain threshold. This allows the system to bypass the encoding process if no VBI data bits are being used. The reference phase angle is determined by first dividing the two low pass filtered signals (from 320 and 321) by the corresponding reference magnitude of the signal (from 325 and 326 respectively) and taking the arcsin of the signal from low pass filter 321 and the arccos of the signal from low pass filter 320. The two signals are then compared to select the signal that is farthest away from the arcsin/arccos (or |y/x|) discontinuity according to the following expression:

reference phase angle=−2 arcsin (y/M), if |y/x| is not large reference phase angle=−2 arccos (x/M), if |y/x| is large, where M is the reference magnitude. Since the demodulated signal (from 315 and 316) is a function of f/2, the factor of two in the equations is required to establish the reference phase. The reference phase angle determination is shown schematically by elements 340, 345, 350, 355 and 360. The reference phase angle may change due to differences in the VBI data changing from line to line. The reference phase angle is then added to the reference phase signal from the video synchronization and clocking circuit 215 to establish the sampling phase at 365. The sampling phase and the reference magnitude signals are thereby provided to the sampling block 230.

Figure 4:
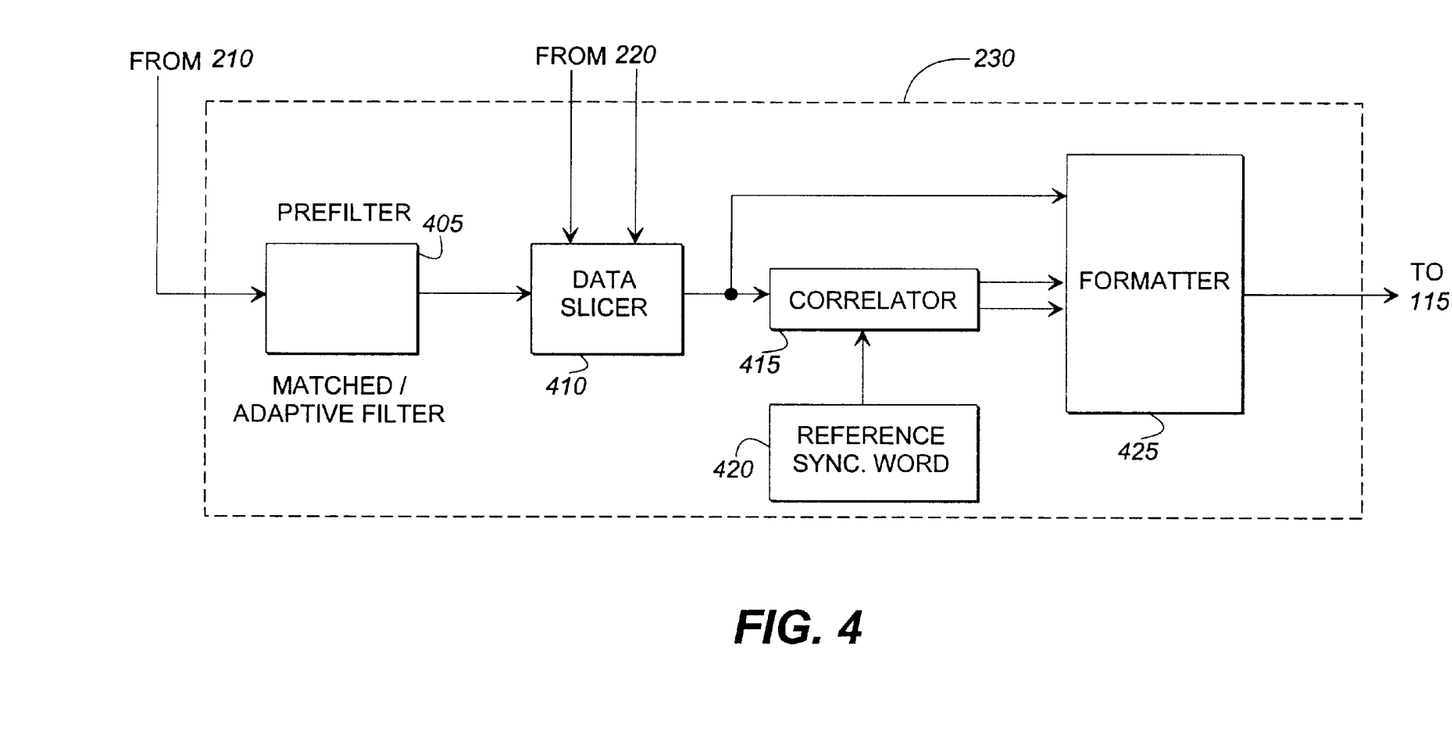
FIG. 4 is a detailed schematic block diagram of the sampling block for VBI data having a periodic clock run-in signal.

FIG. 4 is a detailed schematic diagram of the sampling block 220 for VBI data having a periodic clock run-in signal.

The steps of the software algorithm subroutine may be conceptualized by this diagram as described below. The sampling block 230 preferably includes a prefilter 405, a data slicer 410, a correlator 415, a reference sync word memory 420, and a formatter 425. The prefilter 405 may perform any optional filtering on the VBI data. As preferred, the prefilter 405 is a matched or adaptive filter to provide adequate noise reduction or channel equalization of the VBI data signal before sampling. The data slicer 410 samples the VBI data according to the sampling phase and the reference magnitude signals from the synchronization block 220. The output of the data slicer 410 represents sampled VBI data bits including the clock run-in, the sync words, and the data payload. The correlator 415 receives the sampled VBI data and searches for a sync word or a fixed bit pattern following the periodic clock run-in but prior to the actual VBI data for any given line of data. The sync word is a known bit pattern for the VBI data format that the encoder 110 is preferably configured to handle. The correlator 415 outputs whether a valid sync word was found and the exact location, or byte alignment, in which it was found. The output of the data slicer 410 and the outputs of the correlator 415 are then sent to the formatter 425 for the VBI data to be packaged in accordance with the VBI packet definition described herein. The formatter 425 essentially creates a VBI header and copies the demodulated data bits into the VBI data packet.

Figure 5:
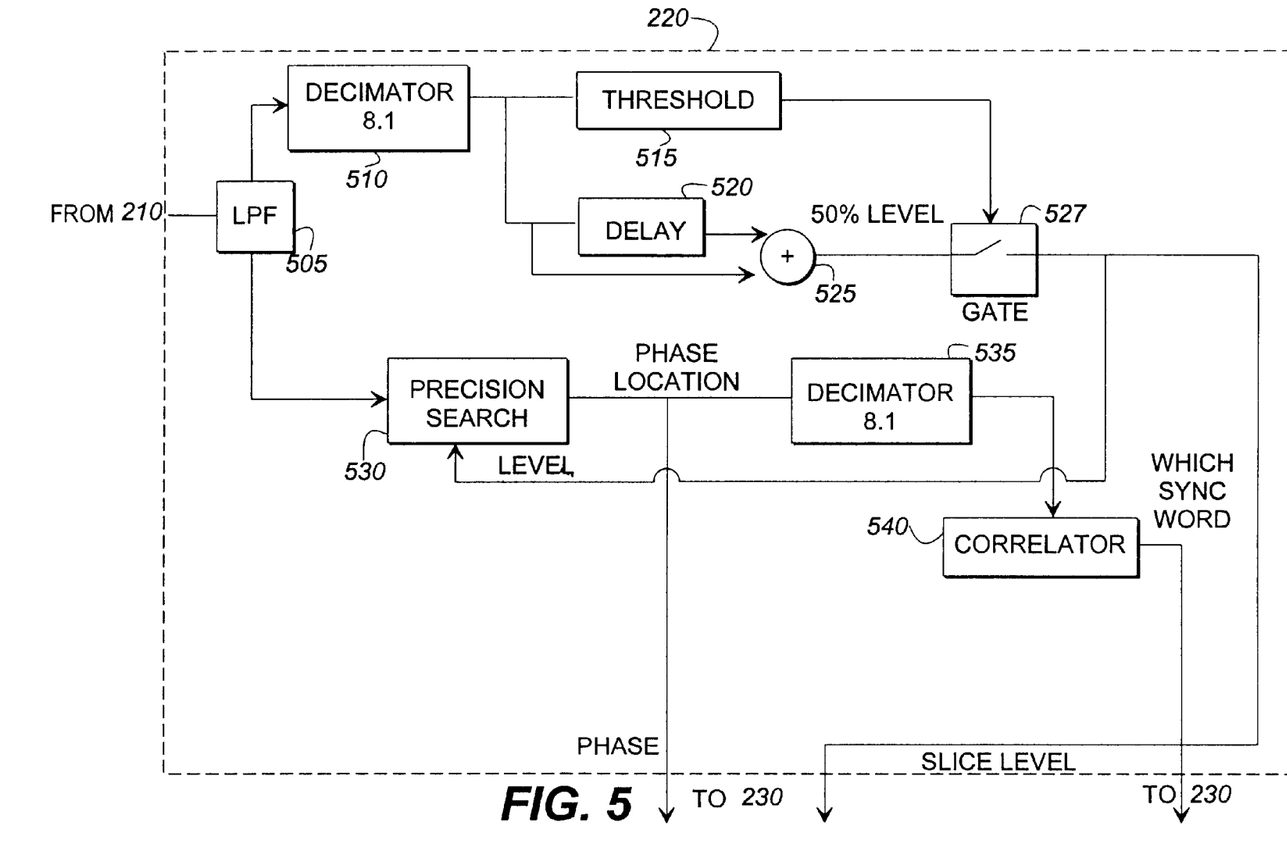
FIG. 5 is a detailed schematic diagram of the synchronization block for VBI data utilizing one or more sync words within the VBI data without a periodic clock run-in signal.

FIG. 5 is a detailed schematic diagram of the synchronization block 220 for VBI data utilizing one or more sync words within the VBI data instead of using a periodic clock run-in signal for synchronization. The sync word for this category of VBI data signals is a bit pattern that precedes the VBI data for a given line of data. The actual bit pattern for the sync word depends upon the VBI data format being used. The steps of the subroutine can be conceptualized by this figure and are described in detail below. Since this type of signal does not have a periodic run-in signal, the signal cannot be quadrature demodulated as in FIG. 2 to determine the sampling phase and reference magnitude. Instead, the VBI signal is first fed through a low-pass filter 505 to remove noise and to prevent aliasing when performing sample rate decimation. The filtered signal is then decimated (at 510) to search (at 515) for data that is above a certain threshold amplitude. The decimation ratio is preferably 8:1. When such data is found, the filtered signal is sampled. If time $T_S$ defines when the threshold amplitude was reached, the signal is sampled at times $T_1$ and $T_2$ where $T_1=T_S-\Delta$ and $T_2=T_S+\Delta$, where $\Delta$ is an arbitrary differential in time. These steps are shown schematically by elements 505, 510, 515, 520, 525, and 527.

The precision search 530 receives the filtered signal from low-pass filter 505 and the sampled data (from 527). The precision search 530 locates the exact sample that contains the rising edge of the first data bit. Once the first data bit is located by the precision search 530, the signal is decimated again (at 535) starting exactly one-half bit-width after the sample corresponding to the rising edge. The half bit ensures that the bits are sampled in the middle of the bit for optimum noise and jittering immunity. The decimated signal (from 535) is fed to a correlator 540 which identifies the reference sync word being used in the VBI data stream. The correlator 540 has stored, preferably in memory, known sync words for various known VBI data formats to match with the sync word for the received VBI signal. A match with a known sync word for a known VBI data format would identify the particular VBI data format of the received VBI signal. The correlator 540 searches for a matching sync word and outputs the particular sync word which was correlated and provides this information to the sampling block 230.

Figure 6:
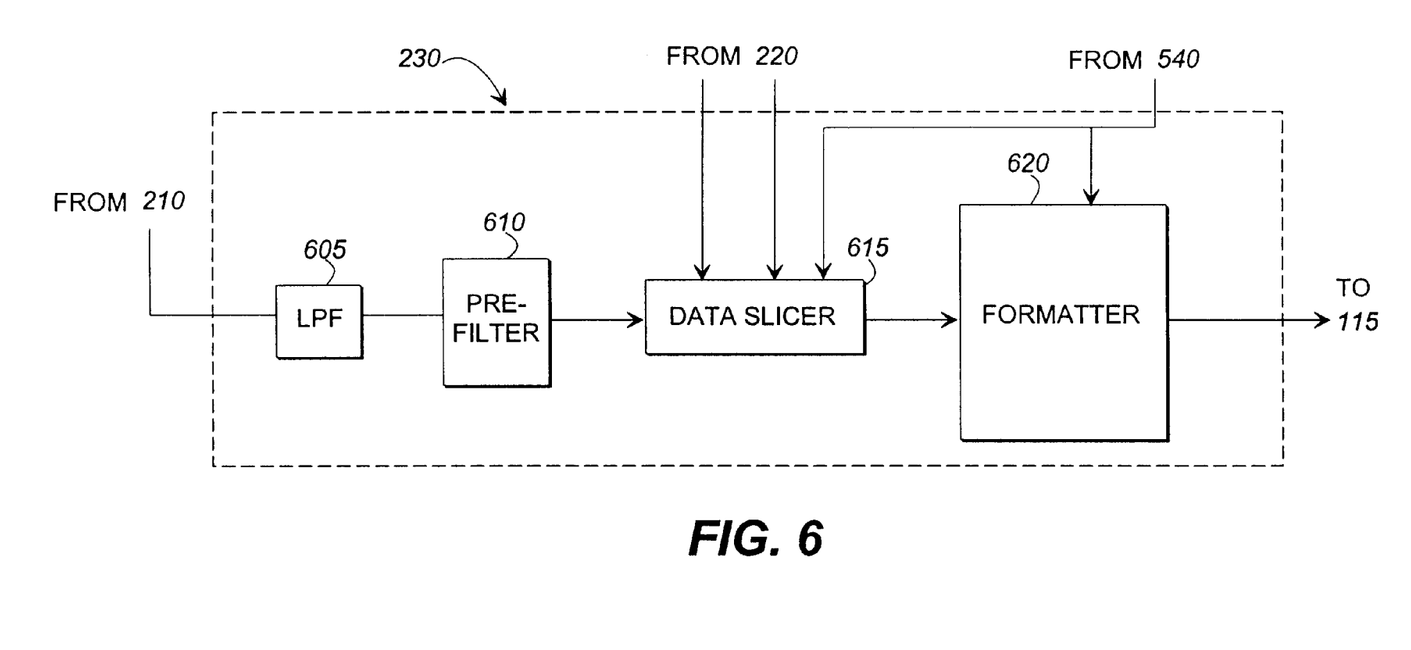
FIG. 6 is a detailed schematic block diagram of the sampling block for VBI data utilizing one or more sync words within the VBI data without a periodic clock run-in signal.

FIG. 6 is a detailed schematic diagram of the sampling block 230 for VBI data utilizing one or more sync words within the VBI data. The sampling block 230 consists of a low-pass filter 605, a prefilter 610, a data slicer 615, and a formatter 620. The low-pass filter 605 basically serves to reduce noise in the signal. The prefilter 610 may perform any optional filtering on the VBI data. As preferred, the prefilter 610 is a matched or adaptive filter to provide adequate noise reduction or channel equalization of the VBI data signal before sampling. The data slicer 615 receives information relating to the sampling phase from the output of the precision search 530, information relating to the sampled data (from 527), and information relating to the sync word being used from the correlator 540. Information relating to the particular sync word serves to allow the data slicer 615 to adjust its sampling rate in accordance with the VBI data format being used. Based on this information, the data slicer 615 samples the VBI data and outputs the data to the formatter 620. The formatter 620 also receives information relating to the sync word from the correlator 540 and completes manipulation of the VBI data to be packaged in accordance with the VBI packet definition described herein. The formatter 620 essentially creates a VBI header and copies the demodulated data bits into the VBI data packet.

Figure 7:
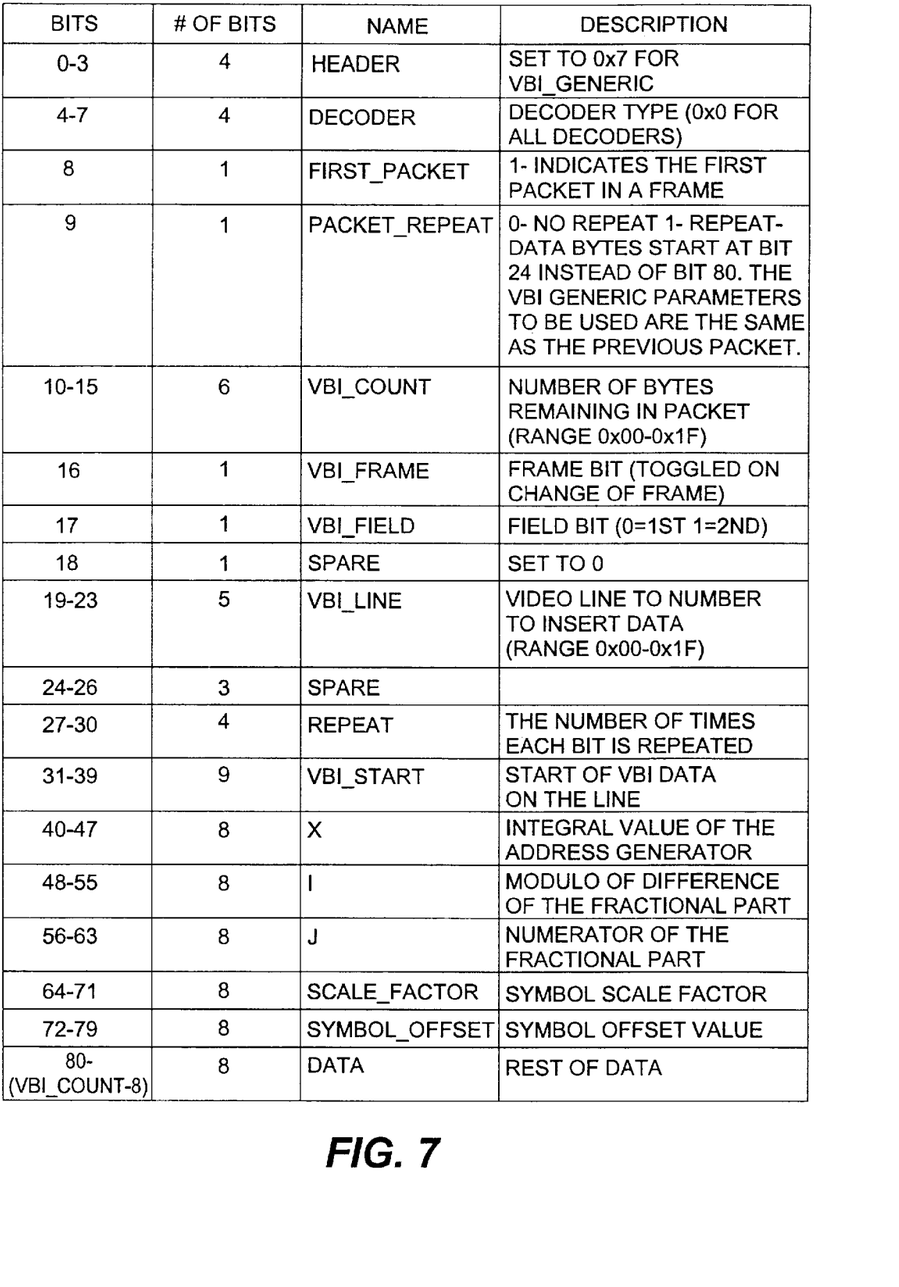
FIG. 7 is a chart describing the header format for the VBI data in accordance with the present invention.

FIG. 7 is a chart describing the header for the VBI data in accordance with the present invention. The header of the VBI data packet provides all of the necessary information for reconstructing the VBI data in accordance with its original data format. Starting from the first set, each set of bits is described below. The header bits serve to identify that the VBI packet is formatted in accordance with the present invention. The decoder bits are available bits for potential future expansion of the present invention. The first_packet bit acts as an indicator that the attached data is the first packet of data for a data frame and allows the receiving decoder 125 to synchronize the VBI data with the corresponding video signals. VBI data after it is transformed and sent over the communications medium may get out of sync with the corresponding video signal. In this case, if the decoder 125 receives the first data packet and the video signal is still in the past frame, the decoder 125 can wait for the video signal to catch up before it begins to display the VBI data. The packet_repeat bit indicates whether the packet parameters for this packet of data are the same as those of the previous data packet. If so, then the remaining header information does not need to be retransmitted. The receiving decoder 125 can display the attached data in the same format as that dictated by the header information of the previous data packet. The vbi_count bits provide information as to the number bits that are still remaining in the VBI data packet. The vbi_frame bit and the vbi_field bit are used for the same reason as the first_packet bit, namely to ensure that the VBI data is in sync with the corresponding video signal. The spare bits do not convey any pertinent information. They are included to maintain the header bits in groups of eight for ease of implementation in the hardware. The vbi_line bits describe the particular line number in which the attached data packet is to be inserted. The repeat bits indicate whether the data bits should be repeated and if so, how many times each data bit is to be repeated. This allows the decoder to use a fast bit rate to generate fast edges on a low symbol rate effectively allowing the ability to vary the edge rate for a given symbol rate. The vbi_start bits describe the exact horizontal position on a particular line number of the television screen in which the attached data packet is to be displayed. The X, I and J bits are used by the decoder 125 as described herein to recreate the frequency of the original VBI data format. The scale_factor and symbol_offset bits allow the data to be sized and offset in accordance with the original VBI data format. The data bits represent the actual packet of data associated with the header.

Receiving Side

Figure 8:
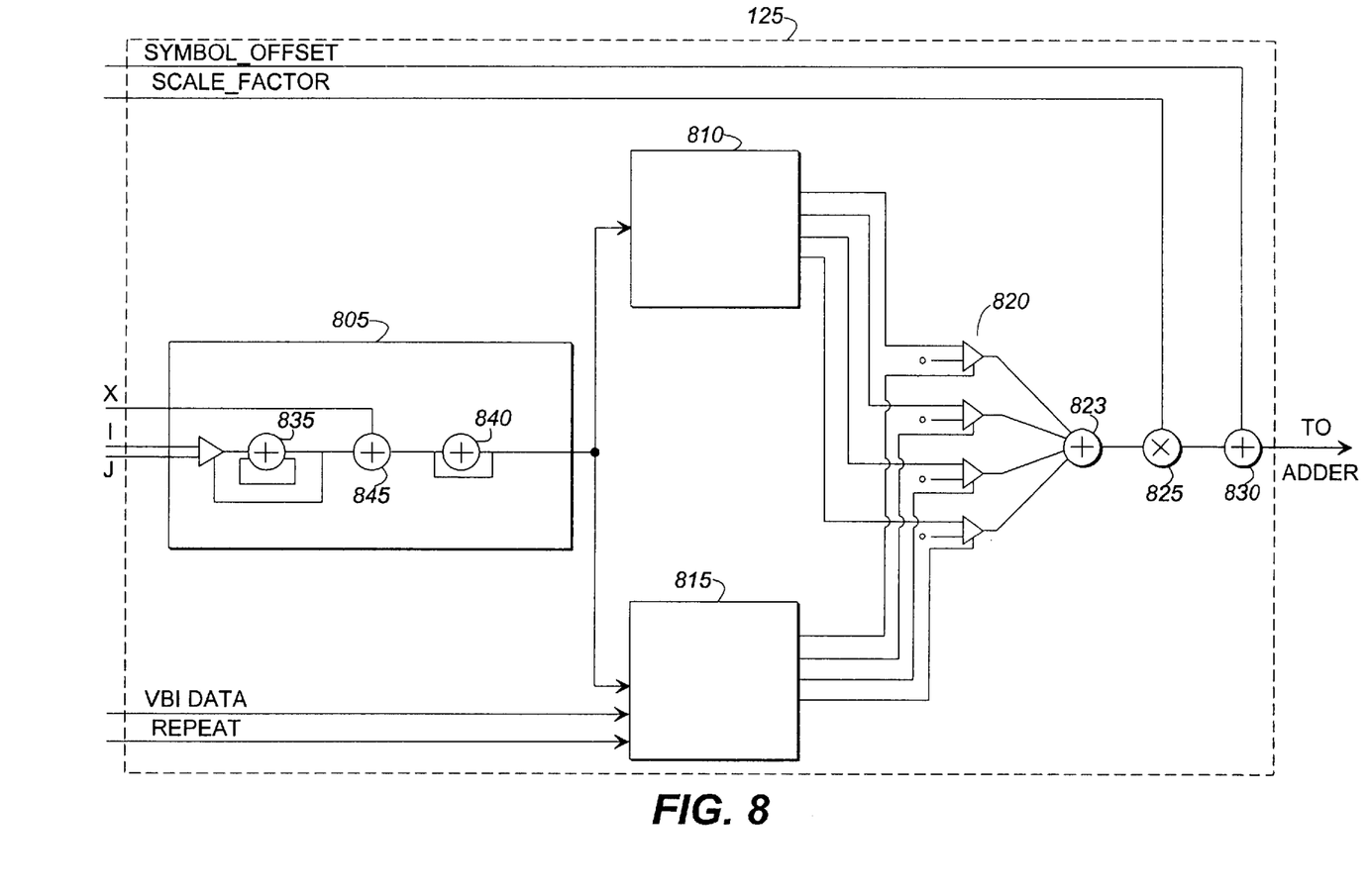
FIG. 8 is a schematic diagram of the decoder in accordance with the present invention.

On the receiving side, VBI data is received and reformatted into the original data format. The receiver 120 receives both the audio/video and the VBI data from the communications medium and provides the VBI data to the decoder 125. The decoder 125 processes the header to establish certain parameters of the incoming VBI data packets. The decoder 125 also de-manipulates the VBI data into its original format under procedures described herein. The VBI data may then be added to the received audio/video and then be sent to the TV set 130 or another VBI receiver or decoder device for further processing or viewing. FIG. 8 is a schematic diagram of the decoder 125 in accordance with the present invention. The decoder 125 generally includes an address generator 805, a one-bit waveform Prom 810, a data manager 815, and multiplexors 820. The decoder 125 is preferably implemented within a Back-End Interface ("BIF") Application Specific Intergrated Circuit ("ASIC") having a fixed system clock of 27 MHz which is provided by Scientific-Atlanta, Inc. Alternatively, a DSP microprocessor or a different type of ASIC implementation may be used. The system may incorporate a discrete hardware implementation as well. The one-bit waveform Prom 810 has stored within its memory the digital approximation of a one-bit waveform. The address generator 805 provides address information to recreate the VBI data stream with the appropriate frequency. The address information provided by the address generator 805 is used by the one-bit waveform Prom 810 to generate the corresponding waveform values for corresponding address locations. The address information is also used by the data manager 815 as a cue for when to output data. The values generated by the one-bit waveform Prom 810 and the data manager 815 are then multiplexed by multiplexors 820 and added (823). The resulting signal is then scaled (825) and offset (830) in accordance with the parameters provided by the header of the incoming VBI data (scale-factor and symbol_offset bits referred to in FIG. 7), thereby producing a VBI data stream in the original VBI data format. The VBI data stream is then output to an adder (not shown) which superimposes the VBI data stream with the video/audio signal before it is sent to the TV set 130. Each of the elements of the decoder 125 are described in further detail below.

The one-bit waveform Prom 810 is preferably a Programmable Read-Only Memory (PROM) which is used to store a digital approximation of a one-bit waveform. The stored one-bit waveform is preferably that of the WST standard. The one-bit waveform of the WST format is similar those of other VBI data formats including, but not limited to, NABTS and VITC. As a result, the present invention is capable of handling any VBI format that uses a waveform similar to that of the WST waveform. Alternatively, a one-bit waveform for any other VBI data format may also be implemented under this invention.

Figure 9:
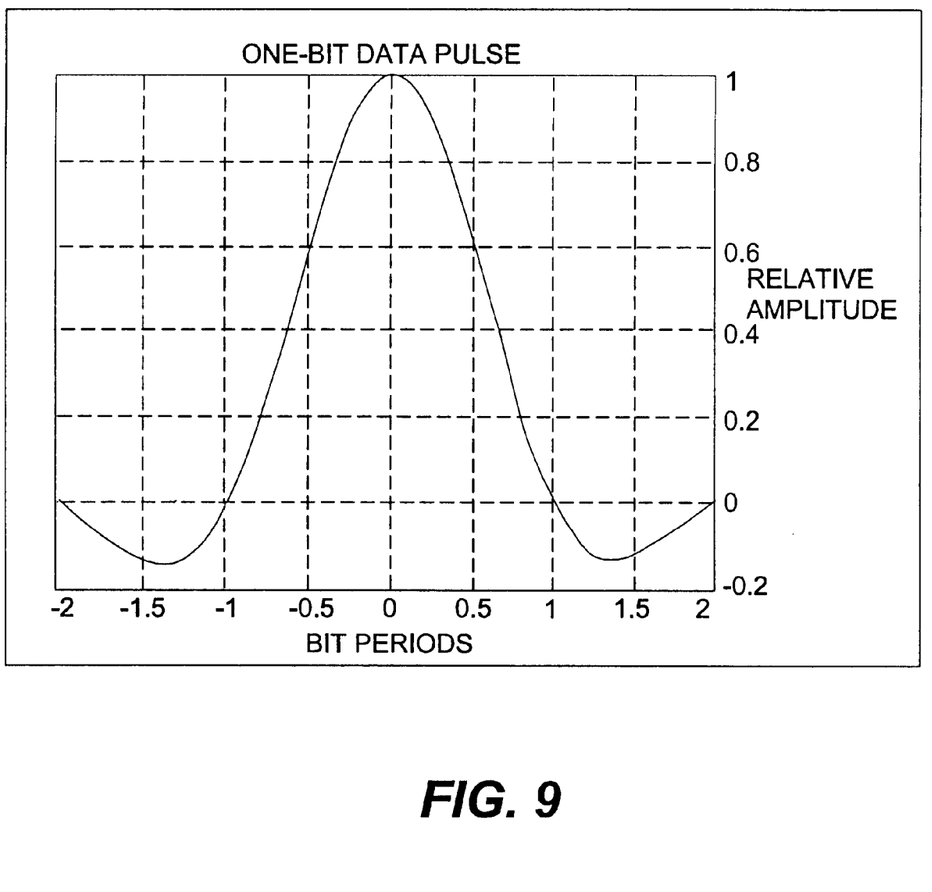
FIG. 9 is a graph of a one-bit waveform in accordance with the World Systems Text standard.
Figure 10:
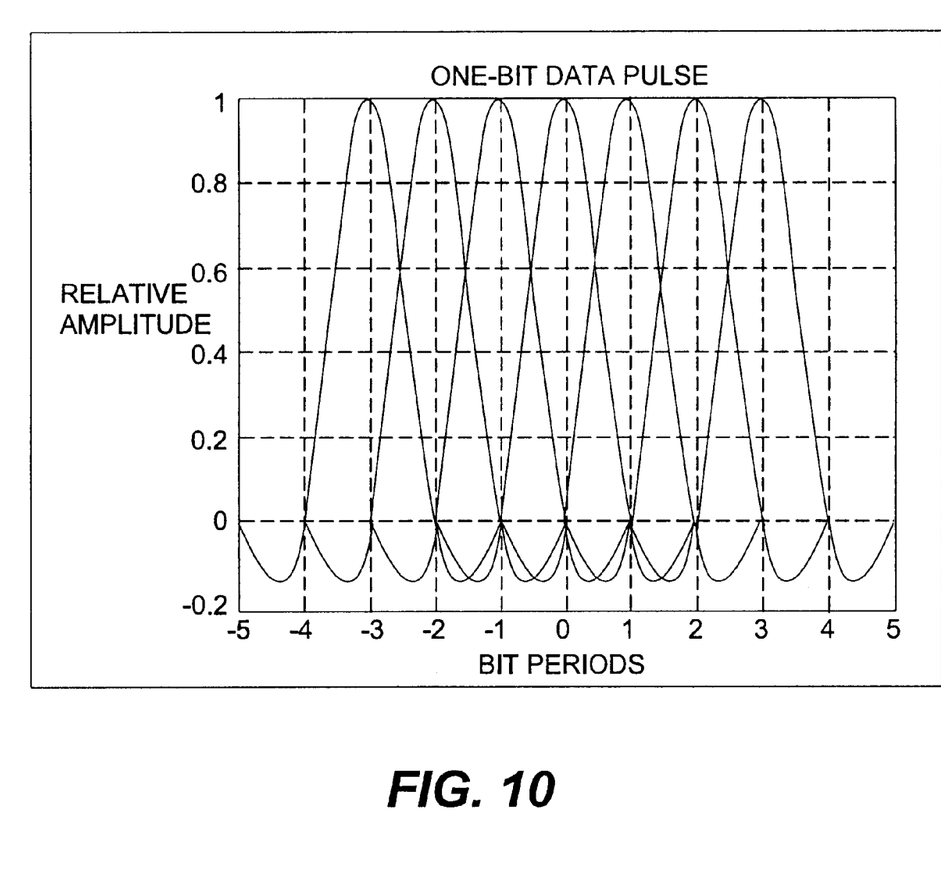
FIG. 10 is a graph of a stream of seven one-bit waveforms in accordance with the World Systems Text standard.

FIG. 9 is a graph of a one-bit waveform in accordance with the WST standard. The one-bit waveform as implemented in accordance with the present invention to support the WST standard is four bits wide. Thus, the waveform overlaps with other one-bit waveforms in a data stream. Since the one-bit waveform is spread over four bits, any given point of a WST signal is the sum of four points of a one-bit waveform covering four data bits. For example, the waveform representation for 1111111 under the WST standard would be described by adding the stream of one-bit waveforms as shown in FIG. 10. At any point along the horizontal axis, a determination of the signal value requires adding values associated with four different one-bit waveforms. Further, if the one-bit waveform is divided into four sections, each a bit wide, the signal value can be determined by adding a point on the waveform from each of those four sections. Hence, the one-bit waveform Prom 810 is essentially a look-up table linking four associated points on the one-bit waveform for each given address value. Thus, when an address location (x-axis) is received, the one-bit waveform Prom 810 generates four values from the one-bit waveform (y-axis) corresponding to that address location. These four values represent the values associated with four different one-bit waveforms.

The four values generated from the one-bit waveform 810 are then multiplexed with the corresponding four outputs of the data manager and added to derive a VBI data stream in accordance with the original VBI data format. Each multiplexor 820 outputs either the one-bit waveform value from the one-bit waveform Prom 810 or a zero depending upon whether the corresponding data value is a one or zero. For example, consider a digital data bit stream of 1010. For any given time where the four data bits would overlap under the WST analog format, the respective four outputs of the data manager 815 are 1010. Also at any point during that time period, the one-bit waveform Prom 810 outputs four corresponding data values of the one-bit waveform. When the signals are multiplexed, the multiplexors 820 for the second and fourth one-bit waveform values output a zero value thereby canceling those components and leaving only the values from the one-bit waveform corresponding to the first and third bits to be added.

The WST one-bit waveform can be approximated by taking a sinc wave and adjusting its frequency to the appropriate width using a Hamming window. Alternatively, a Hanning window or a Kaiser window could also be used. In order to achieve the best accuracy with the minimum number of gates, the bit pattern can be stored such that between two consecutive addresses, the sample values do not differ by more than one quanta. This guarantees accuracy of up to ½ a quanta. To determine this, the maximum rate of change of the WST waveform must be found. In theory, the maximum rate of change can be found by taking the second derivative of the bit function and finding its zero values. However, in practice, this is difficult to do if the resulting equation representing the second derivative of the bit function is difficult to solve. Another approach is to approximate the wave form to a sine wave. As preferred, the sine wave is represented having an 8 bit resolution. In order to accurately represent a sine wave within ½ quanta and with 8 bit resolution, more than 804 addresses would be required. Since the sine wave is a good approximation of the one bit waveform having a greater rate of change than the one bit waveform, 804 addresses would be sufficient to accurately represent the one-bit waveform. Moreover, since the one-bit waveform is symmetrical about the maximum point, only half of the waveform would need to be sampled, requiring only 402 addresses. In rounding up to the closest power of two, 512 samples would be sufficient to adequately approximate the one-bit waveform.

The address generator 805 produces address information for the one-bit waveform Prom 810 and the data manager 815. By providing this address information (x-axis) to one-bit waveform Prom 810, the corresponding values of the one-bit waveform (y-axis) is produced represented by its four outputs. The address generator 805 may then identify the next address location for the next increment point in time to produce the next corresponding increment value of the one-bit waveform from the one-bit waveform Prom 810. The digital representation of the one-bit waveform is thereby recreated by the decoder 125.

An important feature of the address generator 805 is to establish the necessary bit rate for a given VBI format without compromising on accuracy. The necessary bit rate is established by adjusting the system clock rate of the decoder 125 (13.5 MHz for the BIF ASIC) based upon header information from the incoming VBI data stream, namely the X, I and J bits (referring to FIG. 7). The X bits define the integral value of the address generator, the I bits define the modulo of the difference of the fractional part and the J bits define the numerator of the fractional part. The address increment D can be expressed as D=NQ/S, where N is the number of ROM addresses corresponding to one bit period, Q is the symbol rate of the VBI data waveform, and S is the system clock rate of the decoder. The address increment D can also be expressed as a fractional sum or D=B+Y/Z. The X, I and J bits carried by the header of the VBI data can thereby be determined as: X=B, I=N−(Z−Y), and J=Y. In the preferred system, N=256 and S=858 times the video line frequency (13.5 MHZ). To generate, for example, an NABTS standard waveform, Q=364 times the video line frequency. The resulting value for D=256*364/858 can be expressed as a fractional sum or D=108+20/33. The resulting values for X, I, and J are 108, 243, and 20 respectively. Thus, the address generator 805 generates address values having an increment value of D.

The address generator 805 consists of a secondary accumulator 835 and an address accumulator 840. The I and J bits are fed into the secondary accumulator 835 to calculate J/I. The circuit is designed to produce a carry out signal such that if J/I is larger than one, then the integral part, represented by the X bits, is increased by one (at 845). Alternatively, the integral part is increased by one when J/I is added to the next J/I signal and that amount is greater than one. By performing this process, the corresponding one-bit waveform values can then be approximated to the lowest integer value of the address. For instance, if address values were designed to be 2½ time units apart, the address generator 805 would produce address values of 2, 5, 7, 10, etc.

By performing this procedure, one-bit waveform values from the one-bit waveform Prom 810 are taken at varying intervals according to the frequency requirements of the VBI data format of the original signal. As the increments of the address values generated from the address generator 805 are altered, the based frequency of the one-bit waveform is similarly altered. For instance, to increase the frequency of the digital representation of the one-bit waveform, the address generator 805 may be adjusted to produce address locations that are in greater increments in time. To alter the frequency by other ratios, the invention can approximate the address location to the nearest integral location as described above. The decoder 125 thereby generates a VBI data stream in accordance with the frequency requirements for that VBI data format.

The data manager 815 serves to store the incoming VBI data in a four-bit FIFO data stream and output the data to the multiplexors 820 as required by the system. When address information is received from the address generator 805, the data manager 815 outputs four bits of data to the multiplexor. The same four bits are output until the address value reaches a zero-crossing point indicating that a new data bit must be registered. As preferred, zero-crossing points are at each quadrant edge of the one-bit waveform. The zero-crossing point indicates that the address value has reached a point in a new quadrant of the one-bit waveform. For example, in FIG. 10, the zero-crossing points are at each integer bit period value. The data manager 815 is preferably capable of detecting when zero-crossings based on the address information signal. When a zero-crossing is detected, the data manager 815 shifts the four data bits in its output register. For instance, in a data stream represented as 100101, the first four data bits are initially output by the data manager 815, namely 0101. When a zero-crossing signal is received, the first data bit is removed and each of the three remaining bits are shifted one slot. The fourth slot is then replaced by the next data bit in the cue line. Thus, the new output of the data manager 815 after the zero-crossing signal would be 0010. Further, the data manager 815 preferably receives repeat bit (referring to FIG. 7) information from the header of the incoming VBI data. This information allows the data manager 815 to repeat bits of data as established by the repeat bits from the header. As data is output, the data manager 815 becomes ready to receive and store more data. When the data manager 815 becomes ready to receive more data, a data request signal is sent to the receiver 120 or other circuitry receiving and storing the incoming data stream.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. A system for manipulating and de-manipulating Vertical Blanking Interval (VBI) data having an original format, comprising in combination:

a. an encoder coupled to receive said VBI data having said original data format and to manipulate said original VBI format into a general VBI format;

b. a transmission medium operatively connected to said encoder to receive said VBI data having said general VBI format; and c. a decoder coupled to receive said VBI data having said general VBI format from said transmission medium and to de-manipulate said general VBI format of said VBI data into said original VBI format, said encoder comprising a. a synchronization circuit coupled to receive said VBI data having said original format to produce synchronization information, b. a data slicer coupled to receive said synchronization information and said VBI data having said original format to demodulate said VBI data having said original format in accordance with said synchronization information and producing a demodulated signal, and c. a formatter coupled to receive said demodulated signal to convert said demodulated signal into said VBI data having said general VBI data format.

2. The system of claim 1, wherein said encoder is implemented within a microprocessor.

3. The system of claim 1, wherein said decoder further comprises:

a. an address accumulator coupled to receive header information of said VBI data having said general VBI data format to establish address information;
b. a data manager coupled to receive said VBI data having said general VBI data format and said address information to produce data information;
c. a waveform Prom coupled to receive said address information to produce waveform information; and
d. a multiplexing circuit coupled to receive said waveform information and said data information and producing said VBI data having said original data format.

4. The system of claim 3, wherein said decoder is implemented within a BIF chip.

5. A method of manipulating and de-manipulating Vertical Blanking Interval (VBI) data having any one of a plurality of formats, comprising the steps of:
a. manipulating in an encoder said VBI data having a first VBI data format to a second VBI data format;
b. transferring said VBI data having said second VBI data format from said encoder to a decoder; and
c. de-manipulating in said decoder said VBI data having said second VBI data format into said first VBI data format wherein manipulating said VBI data comprises the steps of
a. analyzing said VBI data having said first VBI format to determine phase and magnitude of said VBI data and producing phase and magnitude information,
b. demodulating said VBI data having said first VBI format according to said phase and magnitude information and producing a demodulated signal, and
c. converting said demodulated signal into said VBI data having said second VBI data format.

6. The method of claim 5, wherein said step of de-manipulating further has the steps of:
a. generating address information for establishing the frequency of said VBI data having any one of said plurality of formats;
b. transferring data as required for de-manipulating;
c. producing waveform information in response to receiving address information for at least one corresponding point in a waveform; and
d. multiplexing said waveform information with said VBI having a general format producing said VBI data having any one of said plurality of formats.

7. An encoder for manipulating Vertical Blanking Interval (VBI) data having a first VBI data format into a second VBI data format, comprising in combination:
a. a synchronization circuit coupled to receive said VBI data having said first VBI format and producing synchronization information;
b. a data slicer coupled to receive said synchronization information and said VBI data having said first VBI format for demodulating said VBI data having said first VBI data format according to said synchronization information and producing a demodulated signal; and
c. a formatter coupled to receive said demodulated signal for converting said modulated signal into said VBI data having said second VBI data format.

8. The encoder of claim 7, wherein said encoder is implemented in a DSP microprocessor.

9. A method of encoding Vertical Blanking Interval (VBI) data having a first VBI data format into a second VBI data format, comprising the steps of:
a. analyzing said VBI data having said first VBI format to determine phase and magnitude of said VBI data and producing phase and magnitude information;

b. demodulating said VBI data having said first VBI format according to said phase and magnitude information and producing a demodulated signal; and
c. converting said demodulated signal into said VBI data having said second VBI data format.

10. A decoder circuit for de-manipulating Vertical Blanking Interval (VBI) data having a general format into VBI data having any one of a plurality of formats, comprising in combination:
a. an address accumulator coupled to receive header information of said VBI data having said general VBI data format to establish address information;
b. a data manager coupled to receive said VBI data having said general VBI data format and said address information to produce data information;
c. a waveform prom coupled to receive said address information to produce waveform information; and
d. a multiplexing circuit coupled to receive said waveform information and said data information and producing said VBI data having said original data format.

11. The decoder of claim 10, wherein said decoder is implemented within a BIF chip.

12. A method of de-manipulating Vertical Blanking Interval (VBI) data having a general format into VBI data having any one of a plurality of formats, comprising the steps of:
a. generating address information for establishing the frequency of said VBI data having any one of said plurality of formats;
b. transferring data as required for de-manipulating;
c. producing waveform information in response to receiving address information for at least one corresponding point in a waveform; and
d. multiplexing said waveform information with said VBI having a general format producing said VBI data having any one of said plurality of formats.

13. A system for manipulating and de-manipulating Vertical Blanking Interval (VBI) data having any one of a plurality of formats, comprising in combination:
a. an encoder coupled to receive VBI data having an original data format and to manipulate said original VBI format into a general VBI format, said encoder being implemented within a microprocessor and further having:
  i. a synchronization circuit coupled to receive said VBI data having said first VBI format and producing synchronization information;
  ii. a data slicer coupled to receive said synchronization information and said VBI data having said first VBI format for demodulating said VBI data having said first VBI data format according to said synchronization information and producing a demodulated signal; and
  iii. a formatter coupled to receive said demodulated signal for converting said demodulated signal into said VBI data having said second VBI data format;
b. a transmission medium operatively connected to said encoder to receive said VBI data having said general VBI format; and
c. a decoder coupled to receive said VBI data having said general VBI format from said transmission medium and to de-manipulate said general VBI format of said VBI data into said first VBI format, said decoder being implemented within a BIF chip and further having:
  i. an address accumulator coupled to receive header information of said VBI data having said general VBI data format to establish address information;

ii. a data manager coupled to receive said VBI data having said general VBI data format and said address information to produce data information;
iii. a waveform prom coupled to receive said address information to produce waveform information; and
iv. a multiplexing circuit coupled to receive waveform information and said data information and producing said VBI data having said original data format.

14. A method of manipulating and de-manipulating Vertical Blanking Interval (VBI) data having any one of a plurality of formats, comprising the steps of:
a. manipulating in an encoder said VBI data having a first VBI data format to a second VBI data format, said step of manipulating further having the steps of:
i. analyzing said VBI data having said first VBI format to determine phase and magnitude of said VBI data and producing phase and magnitude information;
ii. demodulating said VBI data having said first VBI format according to said phase and magnitude information and producing a demodulated signal; and
iii. converting said demodulated signal into said VBI data having said second VBI data format.;
b. transferring said VBI data having said second VBI data format from said encoder to a decoder; and
c. de-manipulating in said decoder said VBI data having said second VBI data format into said first VBI data format, said step of de-manipulating further having the steps of:
i. generating address information for establishing the frequency of said VBI data having any one of said plurality of formats;
ii. transferring data as required for de-manipulating;
iii. producing waveform information in response to receiving address information for at least one corresponding point in a waveform; and
iv. multiplexing said waveform information with said VBI having a general format producing said VBI data having any one of said plurality of formats.

* * * * *